United States Patent
Coleman et al.

(10) Patent No.: US 10,992,642 B2
(45) Date of Patent: *Apr. 27, 2021

(54) DOCUMENT ISOLATION

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/138,696

(22) Filed: Sep. 21, 2018

(65) Prior Publication Data

US 2019/0097972 A1    Mar. 28, 2019

Related U.S. Application Data

(60) Provisional application No. 62/561,778, filed on Sep. 22, 2017.

(51) Int. Cl.
*H04L 29/06* (2006.01)
*G06F 21/53* (2013.01)
*G06F 21/74* (2013.01)

(52) U.S. Cl.
CPC .......... *H04L 63/0227* (2013.01); *G06F 21/53* (2013.01); *G06F 21/74* (2013.01);
(Continued)

(58) Field of Classification Search
CPC ............. H04L 63/0227; H04L 63/0218; H04L 63/0272; H04L 63/0281; G06F 21/53; G06F 21/74
(Continued)

(56) References Cited

U.S. PATENT DOCUMENTS

| | | | |
|---|---|---|---|
| 7,467,408 B1* | 12/2008 | O'Toole, Jr. | .......... H04L 63/145 726/13 |
| 7,478,330 B1 | 1/2009 | Branson et al. | |

(Continued)

FOREIGN PATENT DOCUMENTS

RU      2406138 C1    12/2010

OTHER PUBLICATIONS

Barnet, Mark, "Praktikum Po Zaschite Seti Kompanii", Windows IT Pro/RE, Nov.-Dec. 2006, pp. 79-81.

(Continued)

*Primary Examiner* — Longbit Chai
(74) *Attorney, Agent, or Firm* — Condo Roccia Koptiw LLP

(57) ABSTRACT

Methods and systems are disclosed for document isolation. A host computer system may be configured to implement document isolation via one or more of a host-based firewall, an internet isolation firewall, and/or a segregation of a trusted memory space and an untrusted memory space. The host computer system may be configured to access one or more files using a first set of one or more applications and/or processes operating within the trusted memory space and/or a second set of one or more applications and/or processes operating within an untrusted memory space. The host computer system may be configured to open (e.g., always open) the one or more accessed files in the trusted memory space of the host computer system.

19 Claims, 3 Drawing Sheets

(52) U.S. Cl.
CPC ...... *H04L 63/0218* (2013.01); *H04L 63/0272* (2013.01); *H04L 63/0281* (2013.01); *H04L 63/045* (2013.01); *H04L 63/1466* (2013.01)

(58) Field of Classification Search
USPC .......................................................... 726/12
See application file for complete search history.

(56) References Cited

U.S. PATENT DOCUMENTS

| | | | |
|---|---|---|---|
| 7,698,442 | B1 | 4/2010 | Krishnamurthy et al. |
| 7,805,516 | B2 | 9/2010 | Kettler et al. |
| 8,539,561 | B2* | 9/2013 | Gupta ..................... G06F 21/53 726/1 |
| 9,386,021 | B1* | 7/2016 | Pratt ....................... H04L 63/10 |
| 9,942,198 | B2* | 4/2018 | Hoy .................... H04L 63/0272 |
| 2002/0069369 | A1 | 6/2002 | Tremain et al. |
| 2006/0070066 | A1 | 3/2006 | Grobman |
| 2007/0220187 | A1 | 9/2007 | Kates |
| 2007/0260873 | A1 | 11/2007 | Hatfalvi et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0172781 | A1 | 7/2009 | Masuoka et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2012/0023593 | A1 | 1/2012 | Puder et al. |

OTHER PUBLICATIONS

Burnett, Mark, "How I Secured One Company's Network", Using Log Parser, Virtualization, and a Little Psychology, Sep. 17, 2006, 4 pages.

Laverick, Mike, "Hypervisor Management and Optimization for Advanced Virtualization", E-book, TechTarget, 2010, 13 pages.

Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.

Reuben, Jenni Susan, "A Survey on Virtual Machine Security", TKK T-110.5290 Seminar on Network Security, Oct. 11-12, 2007, 5 pages.

Villeneuve, Nart, "Command and Control in the Cloud", Malware Explorer, Oct. 22, 2010, 3 pages.

Wikipedia, "Computer Networking", Available at https://en.wikipedia.org/wiki/Computer_network, Dec. 2010, 19 pages.

Wikipedia, "Computer Security", Available at https://en.wikipedia.org/wiki/Computer_security, retrieved on Dec. 2010, 27 pages.

Wikipedia, "Cyber Security Standards", Available at https://en.wikipedia.org/wiki/Computer_security_standards, retrieved on Dec. 2010, 9 pages.

Wikipedia, "HTTP Secure", Available at https://en.wikipedia.org/wiki/HTTPS, retrieved on Dec. 2010, 9 pages.

Wikipedia, "Hypervisor", Available at <https://en.wikipedia.org/wiki/Hypervisor>, retrieved on Dec. 2010, 6 pages.

Wikipedia, "Internet Protocol", Available at https://en.wikipedia.org/wiki/Internet_Protocol, retrieved on Dec. 2010, 5 pages.

Wikipedia, "Multiprotocol Label Switching", Available at <https://en.wikipedia.org/wiki/Multiprotocol_Label_Switching>, retrieved on Dec. 2010, 8 pages.

Wikipedia, "Network Address Translation", Available at https://en.wikipedia.org/wiki/Network_address_translation, Dec. 2010, 12 pages.

Wikipedia, "Security-Focused Operating System", Available at https://en.wikipedia.org/wiki/Security-focused_operating_system, retrieved on Dec. 2010, 9 pages.

Wikipedia, "Virtual Desktop", Available at https://en.wikipedia.org/wiki/Virtual_desktop, retrieved on Dec. 2010, 5 pages.

Wikipedia, "Virtual Private Network", Available at https://en.wikipedia.org/wiki/Virtual_private_network, retrieved on Dec. 2010, 9 pages.

* cited by examiner

DOCUMENT ISOLATION

CROSS-REFERENCE TO RELATED APPLICATION

This application claims the benefit of U.S. Provisional Application Ser. No. 62/561,778 filed Sep. 22, 2017, the contents of which are incorporated by reference herein.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware.

The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system.

SUMMARY OF THE INVENTION

Methods and systems are disclosed for document isolation. A host computer system may be configured to implement document isolation via one or more of a host-based firewall, an internet isolation firewall, and/or a segregation of a trusted memory space and an untrusted memory space.

The host computer system may include a processor and a memory configured to implement a first firewall, a first memory space, and/or a second memory space. The first memory space may be configured to enable storage and/or operation of a workspace. In examples, the first memory space may be considered trusted memory space that is configured to enable storage and/or operation of a workspace. The workspace may be configured to execute a first set of one or more applications and/or processes running on an operating system of the host computer system. The second memory space may be configured to enable storage and/or operation of a second set of one or more applications and/or processes associated with an isolated computing environment. The isolated computing environment may include, but not limited to, a sandboxed computing environment, a virtual machine computing environment, a hybrid of a sandboxed computing environment and a virtual machine computing environment, and/or the like. The second memory space for the isolated computing environment may be considered untrusted memory space that is configured to enable storage and/or operation of one or more applications and/or processes associated with the sandboxed computing environment. The sandboxed computing environment may be associated with a sandbox container process configured to run on the operating system. The sandboxed computing environment may be enforced via the sandbox container process. The sandbox container process may segregate the workspace associated with the first memory space from the sandboxed computing environment associated with the second memory space. For example, a firewall (e.g., an internal isolation firewall) may be configured to isolate the second memory space from the first memory space. The sandbox container process may be configured to prevent data from being communicated between the sandboxed computing environment and the workspace without an explicit user input.

The host computer system may be configured to access one or more files using the first set of one or more applications and/or processes and/or the second set of one or more applications and/or processes. The host computer system may be configured to open (e.g., always open) the one or more accessed files in the workspace of the host computer system.

For example, the host computer system may be configured to retrieve one or more files using at least one of the second set of the one or more applications or processes associated with the second memory space. The host computer system may request an explicit user input to allow the one or more files to be transferred from the second memory space to the first memory space. If the explicit user input has been received, the host computer system may open the one or more files using at least one of the first set of the one or more applications or processes in the first memory space. The firewall (e.g., the internal isolation firewall) may be configured to block transmission of the one or more files from the second memory space to the first memory space absent the explicit user input. The firewall (e.g., the internal isolation firewall) may be configured to block incoming transmission from the second memory space (e.g., via one or more applications or processes associated with the sandboxed computing environment) to the first memory space associated with the workspace.

The first firewall may be a host-based firewall. The first firewall may be configured to operate between the workspace of the first memory space and a connected local area network (LAN). The first firewall may be configured to determine whether the host computer system is connected to a trusted LAN or an untrusted LAN.

The first firewall (e.g., host-based firewall) may implement a first configuration (e.g., first security configuration) when the host computer system is connected to the trusted LAN. The first configuration of the first firewall may allow the first set of one or more applications and/or processes to send one or more communications directly to one or more network destinations on the trusted LAN, for example, without requiring the first set of one or more applications and/or processes to utilize a predetermined set of communication protocols. The first configuration of the first firewall may be configured to block incoming traffic to the workspace that is not originated from one or more predefined devices or via one or more predefined ports. The first configuration of the first firewall may be configured to allow outgoing traffic from the first set of the one or more applications or processes from the workspace to the trusted LAN.

The first firewall may implement a second configuration when the host computer system is connected to the untrusted LAN. The second configuration (e.g., second security configuration) of the first firewall may prevent unauthorized communications between the first set of one or more applications and/or processes and one or more untrusted network destinations. For example, the second configuration of the host-based firewall may be configured to block incoming traffic to the workspace from the untrusted LAN and block outgoing traffic from the first set of the one or more applications or processes from the workspace to the untrusted LAN. The second configuration of the first firewall (e.g., host-based firewall) may allow at least the second set of one or more applications or processes to access untrusted network destinations via one or more network ports.

The second configuration implemented by the first firewall may allow one or more of the first set of applications and/or processes to communicate with a trusted network destination using a predetermined set of communication protocols. The predetermined set of communication protocols may include communicating with the trusted network destination via a Virtual Private Network (VPN) client associated with the workspace. The trusted network destination may be located on a trusted LAN. The VPN client may be configured to establish an encrypted communication system with the trusted network destination via the untrusted LAN. The second configuration of the first firewall may allow one or more of the first set of one or more applications and/or processes to access the trusted LAN via the untrusted LAN and/or the Internet using the VPN client. The VPN client may be configured to enable access to the trusted LAN via the untrusted LAN and/or the Internet.

DETAILED DESCRIPTION

Figure 1:
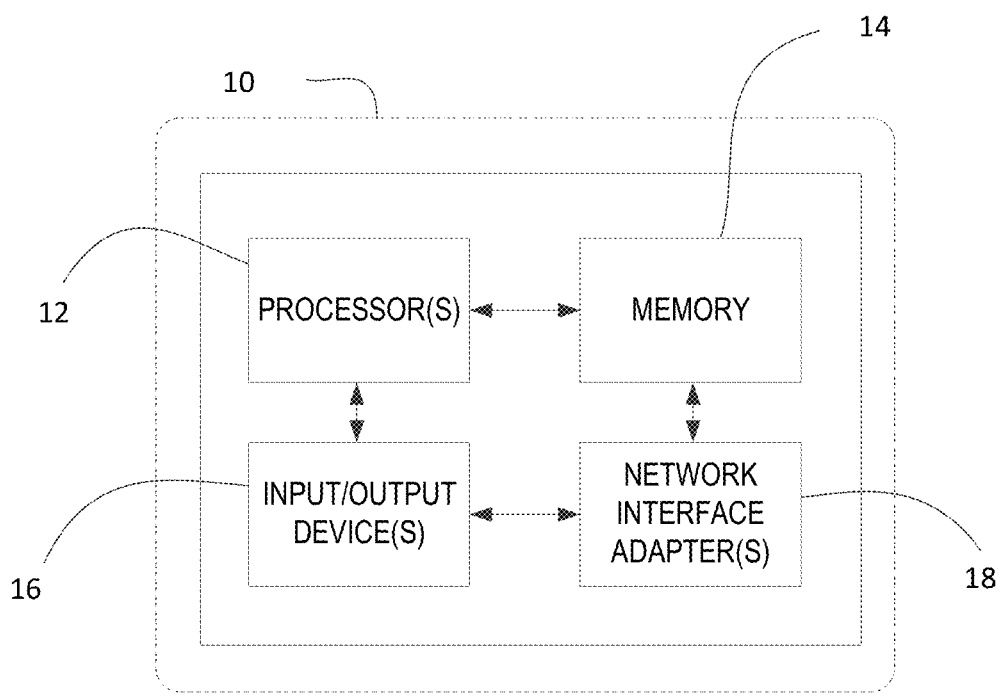
FIG. 1 depicts an example host computer system.

Systems and methods are disclosed for data isolation on a host computer system. For example, the host computer system may isolate sensitive, confidential, and/or proprietary data on the host computer system. The sensitive, confidential, and/or proprietary data may be isolated to a trusted environment of the host computer system. The trusted environment may be the operating system of the host computer system. The host computer system may be a laptop computer, a mobile phone, a tablet, etc. The host computer system may be connected to a network (e.g., a local area network (LAN), a wide area network (WAN), a cellular network, a Wi-Fi network, a digital subscribers line (DSL) network, a cloud computing network, a data center, an ad-hoc network, a satellite network, a cable modem network, etc.). The network may be a trusted network or an untrusted network. The host computer system may be a physical machine, a virtual machine, or a combination thereof.

Data isolation (e.g., document isolation) may be provided via untrusted memory space segregation (e.g., isolated computing environment, such as a sandboxed computing environment). The host computer system may have a sandbox protected application or process and/or an internal isolation firewall running thereon. For example, one or more of web browsers, file transfer applications, email applications, chat or instant messaging application, P2P file sharing applications, automatic web backup application, anti-virus and other security applications, collaboration software applications, remote desktop applications, screen and resource sharing applications, gaming applications, applications that rely on cloud resources for processing resources, and/or the like may wholly or partially be contained in a sandboxed computing environment. In an example, other isolation methods such as operating the applications within a virtual machine may be used.

The sandbox protected application or process may operate within a sandboxed computing environment. The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandboxed container process may be configured to enable one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace or any other memory space enabled by the operating system of the host computer system.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating system resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to access untrusted network destinations via an access connection device. The access connection device may be a web proxy, for example. The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

The host computer system may access one or more files, for example, using the one or more processes or applications operating within the sandboxed computing environment. The one or more files may be accessed via a trusted network destination or an untrusted network destination. The host computer system may be configured to open the one or more files in the workspace. For example, the host computer system may receive a selection of the one or more files. The host computer system may determine to open the one or more selected files in the workspace.

The host computer system may access one or more files, for example, using one or more processes operating within the operating system. For example, the one or more files may be accessed via a trusted network destination and/or a trusted device on a trusted network. The host computer system may be configured to open the one or more files in the workspace. For example, the host computer system may receive a selection of the one or more files. The host computer system may determine to open the one or more selected files in the workspace. For example, the host computer system may be configured to open all files in the workspace. Opening files in the workspace may use less system resources than opening files in the sandboxed computing environment. The host computer system may be configured to open one or more local files stored in the first memory space in the workspace.

Document isolation may be provided via an internal isolation firewall. Opening selected files in the workspace may introduce malware to the host computer system. For example, malware may be downloaded when the one or more files are selected and/or opened. The malware may be downloaded to the workspace of the host computer system. The internal isolation firewall may prevent the malware on the workspace from reaching an untrusted network destination. For example, the internal isolation firewall may enable separation between the sandboxed computing environment and the workspace.

Whereas, if files accessed were opened in the sandboxed computing environment, any malware introduced to the sandboxed computing environment may be able to access untrusted network destinations. For example, if multiple files were opened in the sandboxed computing environment, malware introduced to the sandboxed computing environment may access those files and/or may exfiltrate data in those files to an untrusted network destination.

Document isolation may be provided via a host-based firewall. The host-based firewall may implement one or more configurations based on whether the host based computer system is connected to a trusted LAN or an untrusted network (e.g., such as an untrusted LAN). When the host computer system is connected to a trusted LAN, the host-based firewall may implement a first configuration. When the host computer system is connected to an untrusted LAN, the host-based firewall may implement a second configuration. The first configuration may be associated with blocking incoming traffic to the trusted host computer system that does not come from one or more predefined devices and/or via one or more predefined ports. In the first configuration, the host-based firewall may allow outgoing traffic to be sent from one or more processes or applications in the workspace, for example irrespective of the type of communication protocol used. In an example, the second configuration may be associated with preventing one or more applications and/or processes operating on the workspace of the trusted host computer system from communicating with one or more untrusted destinations. In an example, the second configuration may be associated with blocking all incoming traffic from the untrusted LAN to the trusted host computer system. The second configuration may allow at least the second set of one or more applications or processes associated with the sandboxed computing environment to access untrusted network destinations via one or more network ports.

The second set of one or more applications and/or processes operating within the sandboxed computing environment may be prevented from accessing any additional resources of the host computer system or may be prevented from access any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may be a software based firewall. The internal isolation firewall may allow certain actions to be performed with approval of the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
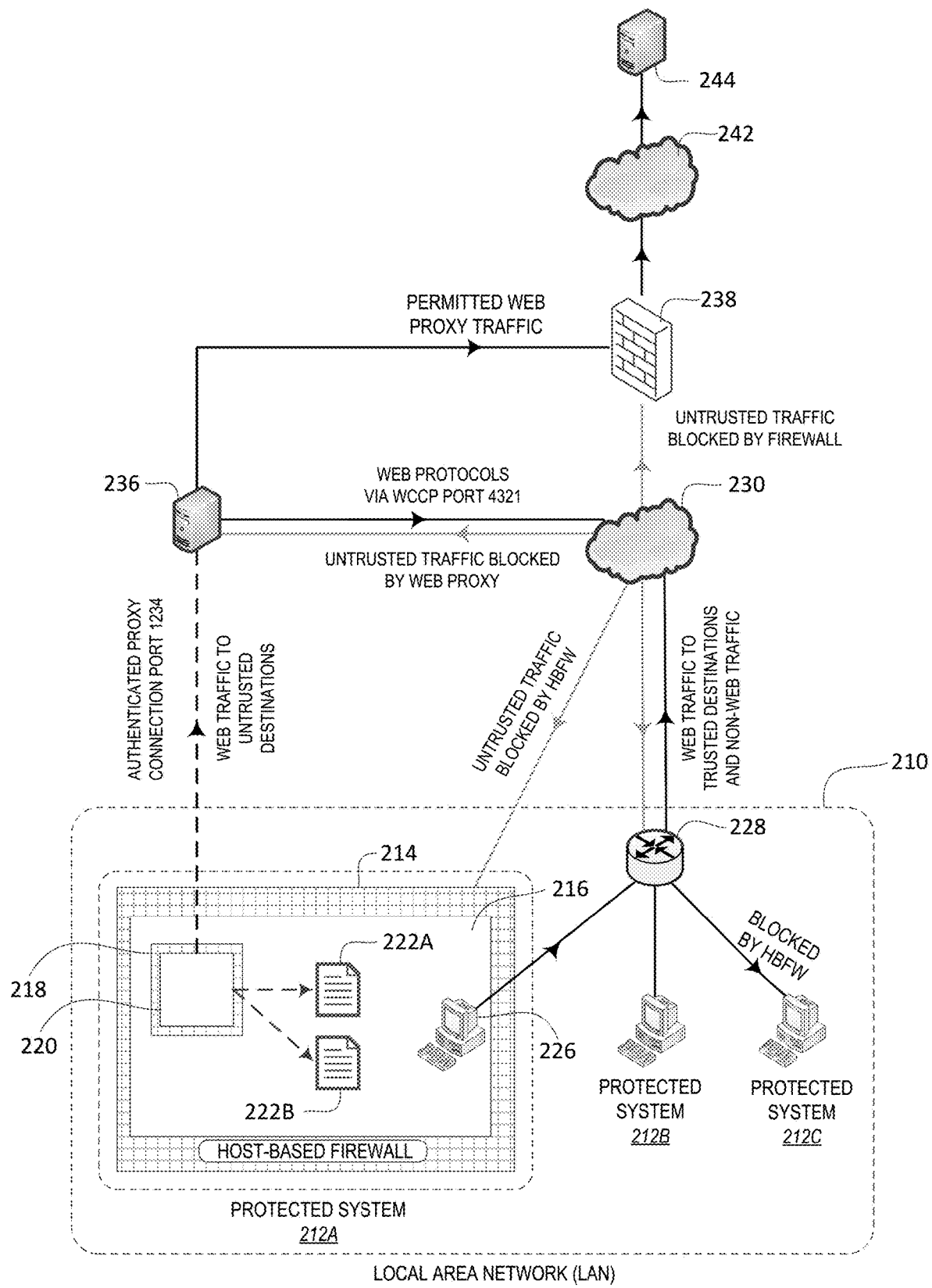
FIG. 2 depicts an example host computer system connected to a trusted local area network (LAN), the example host computer system using a sandbox based network isolation system.

FIG. 2 depicts an example trusted host computer system 212A connected to a local area network (LAN) 210, the example host computer system 212A using a sandbox based network isolation system. The LAN 210 may include a plurality of physical and/or virtual devices. The LAN 210 may include a plurality of host computer systems 212A, 212B, 212C. Each of the host computer systems may transmit electrical data signals to one or more other host computer systems on the LAN 210. Each of the host computer systems 212A, 212B, 212C may be identified by a unique local area network address. The LAN 210 may include a router 228. The host computer systems 212A, 212B, 212C may send web traffic and/or non-web traffic to a trusted network 230 via the router 228. The LAN 210 may send web traffic to one or more untrusted network destinations using one or more of the trusted network 230, a border firewall 238, or a web proxy 236. For example, the LAN 210 may access the internet 242 and/or a device 244 on the internet 242 via the trusted network 230, the border firewall 238, and/or the web proxy 236.

The trusted host computer system 212A may include a host-based firewall 214, an operating system 226, a sandboxed computing environment 220, an internal isolation firewall 218, and a workspace 216. The trusted host computer system 212A may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The trusted host computer system 212A may be operatively connected with one or more user-accessible data entry devices, a display device viewable by a user, and/or a computer-accessible data storage. One or more application programs may run on the operating system 226.

As an example, the trusted host computer system 212A may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the trusted host computer system 212A for common operation. The software programs may include word processing programs, accounting programs, remote connectivity programs, and/or other types of applications.

The trusted host computer system 212A may be configured to isolate communication with untrusted network destinations. The trusted host computer system 212A may isolate communication with untrusted network destinations using one or more of the host-based firewall 214, a border firewall 238, a web proxy 236, an internal isolation firewall 218, or a segregation of untrusted memory space.

The host-based firewall 214 may enable isolation of the trusted host computer system's communication with one or more untrusted network destinations by preventing lateral communication with other devices connected to the LAN 210 and/or the network 230. For example, the host computer system 212 may receive untrusted traffic from the LAN 210 and/or the network 230. The host-based firewall 214 may be configured to block the untrusted traffic from the LAN 210 and/or the network 230. The host-based firewall 214 may be configured to block all incoming traffic from the LAN 210 and/or the network 230. The host-based firewall 214 may be configured to allow traffic received by the trusted host computer system 212A via one or more predetermined devices and/or ports. One or more devices (e.g., predetermined devices) connected to the LAN 210 and/or the network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The web proxy 236 may enable isolation of the host computer system 212 from one or more untrusted network destinations. The network 230 may be configured to utilize a Web Cache Control Protocol. The network 230 may redirect web related traffic that is intended for an untrusted resource or network destination (e.g., such as the Internet 242) to the web proxy 236, for example, using the Web Cache Control Protocol. For example, the network 230 may receive traffic via web related traffic from the host computer system 212. The network 230 (e.g., a router in the network 230) may redirect the web related traffic to the web proxy 236, for example. The Web Cache Control Protocol may route the web-related traffic to the web proxy 236 via a predetermined network port, for example, network port 4321 as shown. The web proxy 236 may determine (e.g., uniquely distinguish) that the traffic received from the network 230 is via the Web Cache Control Protocol, for example, based on the network port. The web proxy 236 may be configured to block traffic associated with an untrusted network destination. The web proxy 236 may receive requests from one or more applications and/or processes operating within the workspace 216 of the host computer system 212. The web proxy 236 may be configured to block one or more requests sent from the one or more applications and/or processes operating within the workspace 216 of the trusted host computer system 212, for example, based on the one or more requests being associated with the network port on which it is received, for example 4321.

The web proxy 236 may be configured to allow one or more processes and/or applications operating within the sandboxed computing environment 220 of the trusted host computer system 212 to access an untrusted network destination. A sandbox container process may enable the sandboxed computing environment 220. The sandbox container process may authenticate with the web proxy 236 on behalf of the one or more processes and/or applications operating within the sandboxed computing environment. The sandbox container process may be configured to authenticate with the web proxy 236 prior to data exchange, for example, using one or more encryption methods (e.g., such as preconfigured credentials stored within an encrypted configuration file). When the sandbox container process has successfully authenticated with the web proxy 236, the web proxy 236 may allow the one or more processes and/or applications operating within the sandboxed computing environment 220 to access the untrusted network destination.

The border firewall 238 may enable isolation of the host computer system 212 (e.g., the workspace 216) from one or more untrusted network destinations. The border firewall 238 may be configured to restrict traffic to the untrusted network destinations (e.g., the Internet 242) from the web proxy 236 and/or the network 230 (e.g., enterprise router 234). The host computer systems 212 may access a whitelisted server, for example, via the border firewall 238. The border firewall 238 may be configured to block communication between the host computer system 212 and one or more untrusted network destinations, for example the Internet 242. For example, the border firewall 238 may be configured to block traffic to untrusted network destinations that is not routed through the web proxy 236.

The sandboxed computing environment 220 may include resources (e.g., a limited set of resources) allocated to operation of a sandbox container process. The sandboxed computing environment 220 may be enforced via the sandbox container process. The sandbox container process may be a security mechanism used to separate resources associated with the sandboxed computing environment 220 from other applications and/or processes that may be running on a workspace 216 of the host computer system 212. The sandboxed container process may be configured to enable one or more applications and/or processes being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace 216.

The workspace 216 may include one or more processes operating within the operating system 226 that are not restricted by the sandbox container process. The operating system 226 of the host computer system 212 may include a set of resources configured to enable operation of the workspace 216 and the sandbox container process.

The host computer system 212 may enable the host-based firewall 214. The host-based firewall 214 may prohibit and/or prevent communication (e.g., direct communication) between the host computer system 212 and other devices on the network 230. Each device on the network 230 may include a host-based firewall (e.g., such as the host-based firewall 214). The host-based firewall 214 may prohibit and/or prevent communication (e.g., direct communication) between the host computer system 212 and other devices within the network 230. For example, the host-based firewall 214 may be configured to block incoming traffic from the other devices within the network 230. The host-based firewall 214 may allow traffic received by the host computer system 212 via one or more predetermined devices and/or ports. For example, one or more devices (e.g., predetermined devices) on the network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the trusted host computer system 212, for example the Windows operating system firewall. The host-based firewall 214 may be implemented using software for configuring and/or implementing restrictive ingress and/or egress policies on the host computer system 212.

The host computer system 212 may run the sandboxed computing environment 220. In examples, the host computer system 212 may run the sandboxed computing environment 220 via a second memory space. The second memory space may be configured to enable storate and operation of the sandboxed computing environment configured to execute one or more applications and/or processes. The sandboxed computing environment 220 may run within the operating system 226 of the host computer system 212. For example, the sandboxed computing environment 220 may be configured to run within a second memory space of the host computer system 212. A first memory space may be configured to enable storage and operation of a workspace configured to execute a first set of one or more applications and/or processes running on the operating system 226 of the host computer system 212. The sandboxed computing environment 220 may be prohibited from communicating with other devices within the network 230.

Browser solutions running within the workspace 216 of the host computer system 212 may be utilized for communication between the host computer system 212 and trusted network destinations. For example, the one or more applications or processes running within the workspace 216 of the host computer system 212 may enable access to the trusted network destinations.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide separate and/or isolated memory space from the workspace 216 of the host computer system 212. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220. The sandbox container process may isolate the first memory space and the second memory space. For example, the sandbox container process may enable the internal isolation firewall 218. The internal isolation firewall 218 may enforce a separation of the first and second memory spaces. For example, the internal isolation firewall 218 may allow a predefined set of processes to be executed within the sandboxed computing environment 220. The internal isolation firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

If malware in a sandboxed computing environment 220 is able to access the resources, assets, and/or files of the operating system 226, the host computer system 212 may be considered infected and untrusted. For example, the malware may bypass the internal isolation firewall 218 via explicit user input. The host-based firewall 214 may prohibit the introduced malware from communicating with any other device on the network 230. For example, the host-based firewall 214 may be configured to block incoming traffic from the network 230.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the border firewall 238 may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

The host computer system 212 and/or the network 230 may limit the adverse effects associated with a received malware. For example, the host computer system 212 and/or the network 230 may prevent the received malware from using its vector to communicate data from the host computer system 212.

An author of the malware may not be aware of any level of efficacy of the introduced malware and/or its successful attack vector. The host computer system 212 and/or the network 230 may prevent data of an infected and/or untrusted host computer system that may have been compromised and/or collected by the malware from being communicated to the author of the malware. For example, the host computer system 212 may prevent communication between an infected and/or untrusted host computer system and the Internet 242 (e.g., the author of the malware via the Internet 242).

The trusted host computer system 212 may be configured to select and/or access one or more files 222A, 222B in the sandboxed computing environment 220. For example, the one or more files 222A, 222B may be accessed via a trusted or untrusted network using one or more processes and/or applications operating within the sandboxed computing environment. When the one or more files 222A, 222B in the sandboxed computing environment are selected and/or accessed, the trusted host computer system may open (e.g., always open) the one or more files 222A, 222B in the workspace 216 of the trusted host computer system 212. Opening the files 222A, 222B in the workspace 216 may require user interaction. For example, when the files 222A, 222B are accessed via the sandboxed computing environment 220, a command prompt may be generated by the trusted host computer system 212. The command prompt may include an option for authorizing opening of the files 222A, 222B in the workspace 216.

Opening the one or more files 222A, 222B in the workspace 216 may ensure that any malware received by the workspace 216 cannot access an untrusted network destination, without user interaction. For example, the internal isolation firewall 218 may prevent the malware from moving from the workspace 216 to the sandboxed computing environment 220. The internal isolation firewall 218 may prevent data transfers between the workspace 216 and the sandboxed computing environment 220. Thus, any malware received by the workspace 216 via the one or more files 222A, 222B cannot access an untrusted network destination to send any data (e.g., such as sensitive, confidential, and/or proprietary data) that resides on the operating system 226 of the trusted host computer system 212. Opening the one or more files 222A, 222B in the workspace 216 may result in a resource savings when compared to opening the one or more files 222A, 222B in the sandboxed computing environment 220 or some other segregated memory space. In examples, opening the one or more files 222A, 222B in the sandboxed computing environment may clog up the system memory and/or resource and may further effect a user experience because of the clogging up of the system memory and/or resource. Opening the one or more files 222A, 222B in the workspace 216 may use less resource (e.g., significantly less resource) when compared to opening the one or more files 222A, 222B in the sandboxed computing environment and may not have an impact on a user experience. Opening the one or more files 222A, 222B in the workspace 216 may enable avoiding opening the one or more files 222A, 222B in an untrusted memory space (e.g., such as the sandboxed computing environment 220) which can be accessed and/or exfiltrated by malware. If the files 222A, 222B originated from a trusted location, (e.g., the workspace or other memory space of the trusted host computer system 212 that is not associated with the sandboxed computing environment 220 and/or trusted network locations), sensitive, confidential, or otherwise private information may be protected from malware by opening the files 222A, 222B in the workspace 216.

Figure 3:
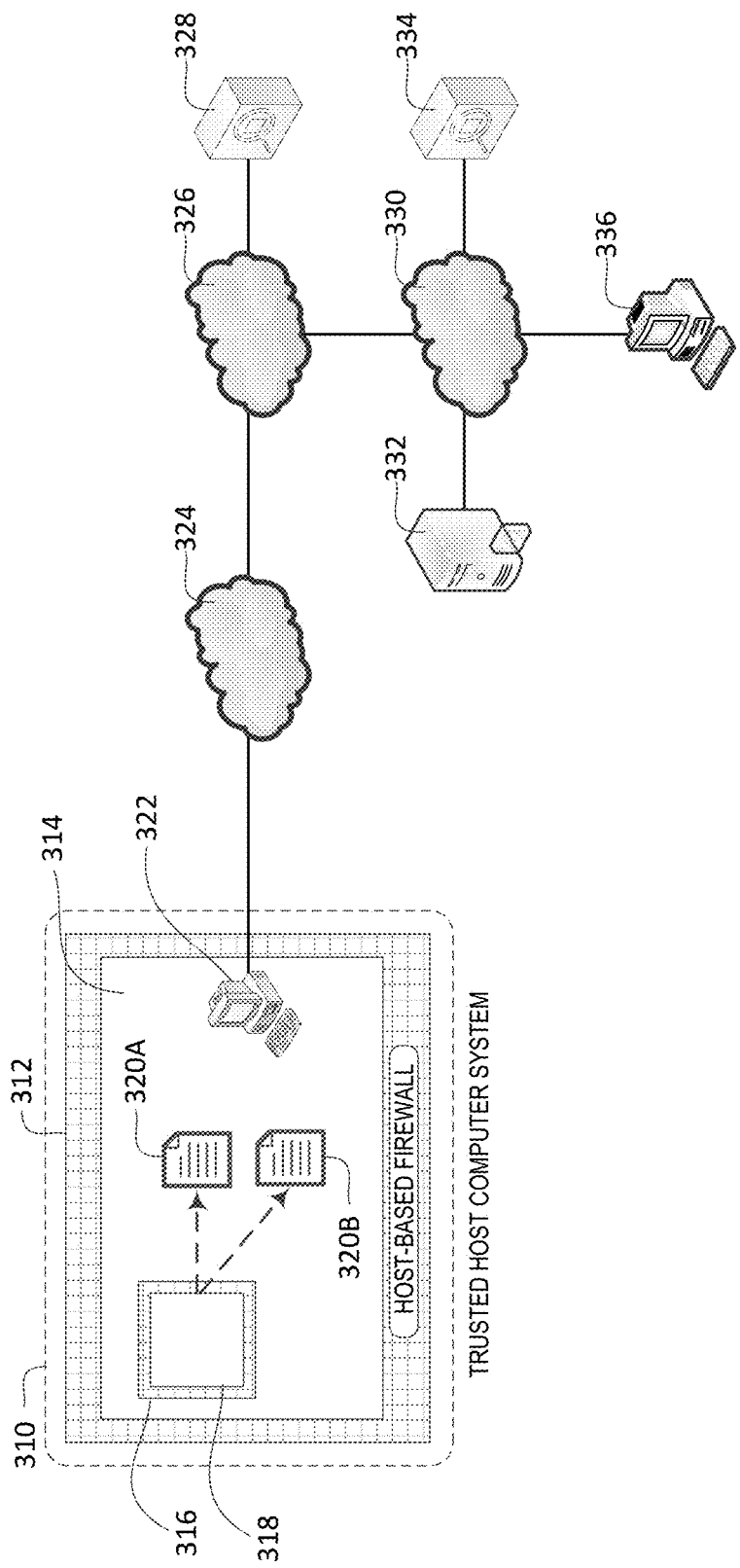
FIG. 3 depicts an example host computer system connected to an untrusted network, the example host computer system using a sandbox based network isolation system.

FIG. 3 depicts an example trusted host computer system 310 connected to an untrusted local area network (LAN) 324. The trusted host computer system 310 may include a host-based firewall 312, an operating system 322, a sandboxed computing environment 318, an internal isolation firewall 316, and a workspace 314. The sandboxed computing environment may be an untrusted portion operating on the trusted host computer system 310. The sandboxed computing environment 318 may be prevented from accessing portions of the operating system 322 that are not associated with the limited or isolated resources dedicated to the sandbox. A sandbox browser program may execute within the sandboxed computing environment 318. The sandbox browser program may be allowed to access computing resources that are associated with or segregated for the sandboxed computing environment 318 but may be restricted or prevented from accessing computing resources of the operating system 322 that are outside of the sandboxed computing environment 318.

The trusted host computer system 310 may be any host computer system, such as a personal computer (PC), a laptop, a virtual machine, and/or any of a variety of other host computer systems operatively connected with one or more user-accessible data entry devices, a display device viewable by a user, and a computer-accessible data storage. The trusted host computer system 310 may include an operating system 322 and one or more application programs on the operating system 322.

As an example, the trusted host computer system 310 may be a PC, with 4 GB RAM and 146 GB hard disk computer-accessible storage, a monitor, a keyboard, and a mouse. The operating system 322 may be Windows-based, Linux-Based, Macintosh-based, and/or the like. The computer-accessible storage may store data corresponding to the software (e.g., computer-readable instructions) stored on the trusted host computer system 310 for common operation. Software programs may include word processing programs, accounting programs, remote connectivity programs, and/or other types of applications.

The sandboxed computing environment 318 may include resources (e.g., a limited set of resources) allocated to operation of a sandbox container process. The sandboxed computing environment 318 may be enforced via the sandbox container process. The sandbox container process may be a security mechanism used to separate resources associated with the sandboxed computing environment 318 from other applications and/or processes that may be running on a workspace 314 of the trusted host computer system 310. The sandboxed container process may be configured to enable one or more applications and/or processes (e.g., such as a browser process) being executed within the sandboxed computing environment 318 to access the resources allocated for operation of the sandbox container process. For example, the one or more applications and/or processes being operated within the sandboxed computing environment 318 may be allowed to access memory associated with the sandboxed computing environment 318. The memory associated with the sandboxed computing environment 318 may be separate from memory that is configured to enable storage and operation of the workspace 314.

The workspace 314 may include one or more processes operating within the operating system 322 that are not restricted by the sandbox container process. The operating system 322 of the host computer system may include a set of resources configured to enable operation of the workspace 314 and the sandbox container process.

The trusted host computer system 310 may enable the host-based firewall 312. The host-based firewall 312 may prohibit communication (e.g., direct communication) between the trusted host computer system 310 and other devices on the untrusted LAN 324. For example, the host-based firewall 312 may be configured to block incoming traffic to the trusted host computer system 310.

The host-based firewall 312 may be implemented using software and/or hardware. For example, the host-based firewall 312 may be implemented using software that is commercially available, for example, such as Symantec Endpoint Protection, MacAfee Host Based Security Systems, etc. The host-based firewall 312 may be implemented using software inherent in the operating system 322 of the trusted host computer system 310, for example the Windows operating system firewall. The host-based firewall 312 may be implemented using software for configuring and/or implementing restrictive ingress and/or egress policies on the trusted host computer system 310. The host-based firewall 312 may be configured to implement rules that prevent communications other than those associated with certain preauthorized application(s) (e.g., VPN client) using predetermined protocols and resources (e.g., predetermined ports and procedures) from communicating via the untrusted LAN 324.

The trusted host computer system 310 may support a VPN client (not shown). The VPN client may operate within the operating system 322 of the trusted host computer system 310. The VPN client may create a secure and/or encrypted communication path through the untrusted LAN 324 and the Internet 326 to a trusted LAN 330.

The VPN client may be implemented using software and/or hardware. For example, the VPN client may be implemented using software that is commercially available, for example, such as CheckPoint Mobile, NordVPN, and/or Cisco VPN client. The VPN may be programmed to use a specific communication pattern and/or specific communication resources when establishing the VPN connection with the trusted LAN 330. The host-based firewall 312 may prevent the VPN client (or any other applications running outside of sandboxed computing environment 318) from communicating via the untrusted LAN 324 unless the specific communication pattern and/or specific communication resources are used for performing such communications.

The trusted host computer system 310 may enable the sandboxed computing environment 318, for example, using the sandbox container process. The sandbox container process may run within the operating system 322 of the trusted host computer system 310. For example, the sandbox container process may be configured to run within a first memory space of the trusted host computer system 310. The first memory space may be configured to enable storage and operation of a workspace 314 configured to execute a first set of one or more applications and/or processes running on the operating system 322 of the trusted host computer system 310.

Browser solutions running within the workspace 314 of the trusted host computer system 310 may be utilized for communication between the trusted host computer system 310 and trusted network destinations. For example, browser processes running within the workspace 314 of the trusted host computer system 310 may enable access to the trusted network destinations via a VPN client. One or more processes or applications within the workspace may be allowed to access a trusted destination provided a predetermined protocol (e.g., a VPN, communication using a set protocol on a set communication port, etc.) is used. In an example, a process or application in the workspace may be blocked from accessing a trusted destination if a predetermined communication protocol is not followed. In another example, the one or more applications or processes in the workspace may be allowed to access a trusted destination without having to utilize a predetermined protocol.

The sandboxed computing environment 318 and/or the sandbox container process may be implemented using software and/or hardware. For example, the sandboxed computing environment 118 and/or the sandbox container process may be implemented using software that is commercially available, for example, such as Invincea Endpoint Protection, Tanium Endpoint Platform, Bromium Advanced Endpoint Security, etc.

The sandboxed computing environment 318 may provide separate and/or isolated memory space from the workspace 314 of the trusted host computer system 310. For example, the sandboxed computing environment 318 may be enforced using a sandbox container process. The sandbox container process may segregate the workspace 314 from the sandboxed computing environment 318. The first memory space (e.g., the workspace memory) may enable storage and/or operation of the workspace 314. The operating system 322 may enable operation of the sandboxed computing environment 318. The second memory space may enable storage and/or operation of one or more applications and/or processes associated with the sandboxed computing environment 318. For example, the second memory space may be reserved for storage and/or operation of the applications and/or processes running within the sandboxed computing environment 318. The sandbox container process may isolate the first memory space and the second memory space. For example, the sandbox container process may enable the internal isolation firewall 316. The internal isolation firewall 316 may enforce a separation of the first and second memory spaces. For example, the internal isolation firewall 316 may allow a predefined set of processes to be executed within the sandboxed computing environment 318. The internal isolation firewall 316 may prevent execution, in the sandboxed computing environment 318, of any processes outside of the predefined set of processes. The second memory space may be referred to as a separate and/or isolated memory space. The sandbox container process may segregate, to the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

The trusted host computer system 310 may be configured to connect to the trusted LAN 330 or the untrusted LAN 324. When the trusted host computer system 310 is connected to the trusted LAN 330, the host-based firewall 312 may implement a first configuration. When the trusted host computer system 310 is connected to the untrusted LAN 324, the host-based firewall 312 may implement a second configuration. The first configuration may be associated with blocking incoming traffic to the trusted host computer system 310 that does not come from one or more predefined devices and/or via one or more predefined ports. In the first configuration, the host-based firewall 312 may allow outgoing traffic to be sent from one or more processes or applications in the workspace 314, for example irrespective of the type of communication protocol used. In an example, the second configuration may be associated with preventing one or more applications and/or processes operating on the workspace 314 of the trusted host computer system 310 from communicating with one or more untrusted destinations. In an example, the second configuration may be associated with blocking all incoming traffic from the untrusted LAN 324 to the trusted host computer system 310.

When the host-based firewall 312 is configured in the second configuration, the host-based firewall 312 may allow one or more of the applications and/or process operating within the workspace 314 to communicate with a trusted network destination on condition that a predetermined set of communication protocols. The predetermined set of protocols may include communicating with the trusted network destination via a VPN client associated with the workspace 314. The trusted network destination may be located on the trusted LAN 330. The VPN client may be configured to establish an encrypted communication system with the trusted network destination via the untrusted LAN 324. For example, the second configuration of the host-based firewall may enable one or more applications and/or processes operating within the workspace 314 to access the trusted LAN 330 via the untrusted LAN 324 and/or the Internet 326 using the VPN client.

In this manner, the host-based firewall 312 can allow the processes or applications of the workspace 314 to send outgoing communications without restriction when implementing the first configuration (e.g., when connected to the trusted LAN), but may limit outgoing communications from the processes or applications of the workspace 314 to communications to trusted destinations that also utilize a predetermined protocol in order to communicate with the trusted destination. In both the first and second configurations, the host-based firewall may block incoming communications to the workspace unless the communication is from a trusted destination and uses a predetermined communication protocol.

When the host-based firewall 312 is configured in the second configuration, the host-based firewall 312 may allow one or more of the applications and/or process operating within the sandboxed computing environment 318 to communicate with an untrusted network destination on a condition that a predetermined set of communication protocols and/or predetermined network ports are utilized.

The workspace 314 may include one or more host monitoring processes configured to monitor operation of the sandbox container process. When the host-based firewall 312 is configured in the second configuration, the host-based firewall 312 may allow the at least one host monitoring process to communicate with a trusted central monitoring system, for example in order to communicate information regarding the monitoring of the sandbox container process. The trusted central monitoring system may be located on the trusted LAN 330. The one or more host monitoring processes may be configured to communicate with the trusted central monitoring system using a predetermined communication protocol that may be permitted by the second configuration of the host-based firewall 312. When at least one host monitoring process is unable to communicate with the trusted central monitoring system, one or more monitoring events may be logged by the one or more host monitoring processes. The one or more host monitoring processes may be configured to send the log to the trusted central monitoring system, for example, upon establishing a communication channel with the trusted central monitoring system.

The second memory space and the processes therein, may have limited access to the resources, assets, and/or files of the remainder of the computer-accessible data storage or memory space of the trusted host computer system 310. Data transfers between the sandboxed computing environment 318 and the workspace 314 of the trusted host computer system 310 may be restricted to set transfer types. The set transfer types may be configured to minimize the possibility of malicious data migrating from the sandboxed computing environment 318 to the workspace 314 of the trusted host computer system 310. The sandboxed computing environment 318 may transfer (e.g., only transfer) data to or from the workspace 314 of the trusted host computer system 310 in response to a user input directing the data transfer. The user input may be an explicit user input such as checking a box and/or selecting a button on an information prompt. The set transfer types that require user input may include one or more manual operations. For example, the set transfer types may include a cut or copy of data, a paste of data, a printing of data to a local printer, or a file transfer.

The operating system 322 may access (e.g., only access) the second memory space associated with the sandboxed computing environment 318 as required for the proper operation of the sandboxed computing environment 318. The internal isolation firewall 316 may be built-in with the sandboxed computing environment 318.

The sandboxed computing environment 318, when activated, may enable communication (e.g., indirect communication) between the trusted host computer system 310 and the untrusted LAN 324 and/or an untrusted network destination on the Internet 326. The sandboxed computing environment 318 may be activated via a desktop shortcut and/or one or more predetermined applications on the operating system 322 of the trusted host computer system 310.

The sandboxed computing environment 318, when activated, may enable indirect communication with the Internet 326 via one or more proxy/web-content filters. For example, a proxy/web-content filter 328 may be included on a trusted LAN 330. The sandboxed computing environment 318 may access the proxy/web-content filter 328 via the untrusted LAN 324, the Internet 326, and/or the trusted LAN 330. As another example, a proxy/web-content filter 328 may be cloud-based and/or outsource computer network-based. The sandboxed computing environment 318 may access the proxy/web-content filter 328 via the Internet 326 and/or the untrusted LAN 324.

One or more sandbox processes and/or applications, when activated by the sandbox container process may initiate a communication session directly to an untrusted network destination.

The sandbox processes and/or applications, when activated by the sandbox container process, may initiate a communication session to the proxy/web-content filter 328 and/or the proxy/web-content filter 334. During the initiation of the communication session, the sandboxed computing environment 318 may validate the authenticity of the sandbox processes and/or applications request for the communication session. The sandboxed computing environment 318 may authenticate the sandbox processes and/or applications request using one or more authentication mechanisms with the proxy/web-content filter 328 and/or the proxy/web-content filter 334. If the sandbox processes and/or applications request fails authentication, the communication session may be terminated, for example, by the proxy/web-content filter 328 and/or the proxy/web-content filter 334.

The sandbox container process may initiate a communication session with the proxy/web-content filter 328 using an authentication mechanism. For example, the authentication procedure may use a predetermined protocol and may communicate with the proxy/web-content filter 328 using a predetermined communication port. As an example, the sandbox container process may initiate the sandbox process associated with the sandbox processes and/or applications and the communication session with the proxy/web-content filter 328 using an NT LAN Manager (NTLM) and the predetermined network port 1111. As another example, the sandbox container process may initiate the communication session with the proxy/web-content filter 328 using a Secure Socket Layer (SSL) and the predetermined network port 1111. As part of the communication session, the sandboxed computing environment 318 may send validation credentials to the proxy/web-content filter 328 and/or the proxy/web-content filter 334, for example, using a predetermined authentication mechanism. The predetermined authentication mechanism may be a username/password combination. The username/password combination may be encrypted, for example, with an asymmetric or a symmetric encryption key system. The proxy/web-content filter 328 may be the only device able to decrypt the username/password combination.

The sandbox container process may be configured to authenticate with the proxy/web-content filter 328. For example, the sandbox container process may authenticate with the proxy/web-content filter 328 on behalf of one or more sandbox processes and/or applications. The sandbox container process may authenticate with the proxy/web-content filter 328 using credentials stored in a configuration file. The configuration file may be encrypted. For example, the sandbox container process may be configured to read only encrypted configuration files.

Upon successful creation of a communication session between the sandboxed computing environment 318 and the proxy/web-content filter 328, the proxy/web-content filter 328 may analyze and/or validate the request to communicate with the untrusted network destination on the Internet 326. If the request to communicate with the Internet 326 is permitted, the proxy/web-content filter 328 may act as an intermediary communication point between the sandboxed computing environment 318 and the untrusted network destination on the Internet 326.

One or more files may be exchanged between the trusted host computer system 310 and the Internet 326. The trusted host computer system 310 may exchange files with a device on the Internet 326. A file transfer may be initiated from the trusted host computer system 310 and/or from the device on the Internet 326. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 310.

The trusted host computer system 310 may be configured to select and/or access one or more files 320A, 320B in the sandboxed computing environment 318. For example, the one or more files 320A, 320B may be accessed via a trusted or untrusted network using one or more processes and/or applications operating within the sandboxed computing environment. When the one or more files 320A, 320B in the sandboxed computing environment are selected and/or accessed, the trusted host computer system may open (e.g., always open) the one or more files 320A, 320B in the workspace 314 of the trusted host computer system 310. Opening the files 320A, 320B in the workspace 314 may require user interaction. For example, when the files 320A, 320B are accessed via the sandboxed computing environment 318, a command prompt may be generated by the trusted host computer system 310. The command prompt may include an option for authorizing opening of the files 320A, 320B in the workspace 314.

Opening the one or more files 320A, 320B in the workspace 314 may ensure that any malware received by the workspace 314 cannot access an untrusted network destination, without user interaction. For example, the internal isolation firewall 316 may prevent the malware from moving from the workspace 314 to the sandboxed computing environment 318. The internal isolation firewall 316 may prevent data transfers between the workspace 314 and the sandboxed computing environment 318. Thus, any malware received by the workspace 314 via the one or more files 320A, 320B cannot access an untrusted network destination to send any data (e.g., such as sensitive, confidential, and/or proprietary data) that resides on the operating system 322 of the trusted host computer system 310. Opening the one or more files 320A, 320B in the workspace 314 may result in a resource savings when compared to opening the one or more files 320A, 320B in the sandboxed computing environment 318 or some other segregated memory space. Opening the one or more files 320A, 320B in the workspace 314 may enable avoiding opening the one or more files 320A, 320B in an untrusted memory space (e.g., such as the sandboxed computing environment 318) which can be accessed and/or exfiltrated by malware. If the files 320A, 320B originated from a trusted location, (e.g., the workspace or other memory space of the trusted host computer system 310 that is not associated with the sandboxed computing environment 318 and/or trusted network locations), sensitive, confidential, or otherwise private information may be protected from malware by opening the files 320A, 320B in the workspace 314.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and MID. A processor may be configured to execute instructions stored in memory to perform the various functions and/or functional modules described herein.

What is claimed:

1. A host computer system comprising:
a memory; and
a processor configured to:
implement a workspace, wherein the workspace is configured by a host operating system to enable operation of a first set of one or more applications or processes via a first memory space;
implement an isolated computing environment, the isolated computing environment using the host operating system and comprising a sandboxed computing environment that uses a second memory space to enable operation of a second set of one or more applications or processes, wherein the second memory space is sperate from the first memory space;
isolate the isolated computing environment that uses the host operating system from the workspace that is configured by the host operating system using an internal isolation firewall;
retrieve one or more files using at least one of the second set of one or more applications or processes associated with the isolated computing environment;
request an explicit user input to allow the one or more files to be transferred from the isolated computing environment to the workspace; and
on a condition that the explicit user input has been received, open the one or more files using at least one of the first set of one or more applications or processes in the workspace, wherein the internal isolation firewall is configured to block transmission of the one or more files from the isolated computing environment to the workspace absent the explicit user input.

2. The host computer system of claim 1, wherein the processor is further configured to implement a host-based firewall, the host-based firewall being configured to prevent communication from an untrusted network destination to the first set of one or more applications or processes associated with the workspace.

3. The host computer system of claim 1, wherein the processor is further configured to implement a host-based firewall that is configured to:
determine whether the host computer system is connecting to a trusted LAN or an untrusted LAN using a whitelist;
on a condition that the host computer system is connected to the trusted LAN, implement a first security configuration to block incoming traffic to the workspace that does not originate from one or more predefined devices or via one or more predefined ports and allow outgoing traffic from the first set of one or more applications or processes from the workspace to the trusted LAN; and on a condition that the host computer system is connected to the untrusted LAN, implement a second security configuration to block incoming traffic to the workspace from the untrusted LAN and block outgoing traffic from the first set of one or more applications or processes from the workspace to the untrusted LAN.

4. The host computer system of claim 1, wherein requesting the explicit user input comprises generating a command prompt requesting the explicit user input, and the explicit user input comprises one or more of checking a box or selecting a button to allow the one or more files to be transferred from the isolated computing environment to the workspace.

5. The host computer system of claim 1, wherein the isolated computing environment is configured to classify a network destination as trusted or untrusted based on one or more of a whitelist comprising a list of trusted network destinations or a blacklist comprising a list of untrusted network destinations.

6. The host computer system of claim 1, wherein trusted network destinations are communicated with the host computer system via at least one of the first set of one or more applications or processes associated with the workspace, and wherein untrusted network destinations are communicated with the host computer system via at least one of the second set of one or more applications or processes associated with the isolated computing environment.

7. The host computer system of claim 1, wherein the processor is further configured to:

detect that the one or more files retrieved using at least one of the second set of one or more applications or processes associated with the isolated computing environment are infected with malware;

determine that the isolated computing environment is an infected isolated computing environment; and block communications from the infected isolated computing environment to the workspace using the internal isolation firewall.

8. The host computer system of claim 1, wherein the processor is further configured to:

detect when malware installed on the workspace attempts to send a communication from the workspace to the isolated computing environment; and block the communication from the workspace to the isolated computing environment using the internal isolation firewall.

9. The host computer system of claim 1, wherein the processor is further configured to:

detect that the one or more files are infected with malware and have been opened in the workspace via the explicit user input; and prevent outgoing communication from the workspace using a host-based firewall.

10. The host computer system of claim 1, wherein a host-based firewall is configured to block incoming lateral communication from one or more devices connected on a network.

11. A system comprising:

a network having a plurality of host computer systems, wherein at least a first host computer system of the plurality of host computer systems is configured to:

implement a workspace, the workspace being configured by a host operating system to enable operation of a first set of one or more applications or processes via a first memory space, implement an isolated computing environment, the isolated computing environment using the host operating system and comprising a sandboxed computing environment that uses a second memory space to enable operation of a second set of one or more applications or processes, wherein the second memory space is separate from the first memory space, isolate the isolated computing environment that uses the host operating system from the workspace that is configured by the host operating system using an internal isolation firewall, retrieve one or more files from an untrusted network destination using at least one of the second set of one or more applications or processes associated with the isolated computing environment, request an explicit user input to allow the one or more files to be transferred from the isolated computing environment to the workspace, and on a condition that the explicit user input has been received, open the one or more files using at least one of the first set of one or more applications or processes in the workspace, wherein the internal isolation firewall is configured to block transmission of the one or more files from the isolated computing environment to the workspace absent an explicit user authorization; and a proxy device configured to:

proxy communication between the isolated computing environment and the untrusted network destination; and block any communication between the workspace of the first host computer system and the untrusted network destination.

12. The system of claim 11, wherein the system further comprises one or more of a border firewall or a router, the border firewall being configured to block unauthorized communications between the network and the untrusted network destination and the router being configured to reroute an outgoing communication from a malware installed on the workspace to the proxy device.

13. The system of claim 12, wherein the proxy device is further configured to allow communications from the isolated computing environment to the untrusted network destination and block communications from the workspace.

14. The system of claim 11, wherein the system further comprises a second host computer system configured to implement a second host-based firewall associated with the second host computer system that is configured to block a communication from a malware installed on the workspace associated with the first host computer system.

15. The system of claim 14, wherein the second host-based firewall is further configured to allow a communication from the at least one of the first set of one or more applications or processes associated with the workspace of the first host computer system and block a communication not associated with a predetermined trusted address.

16. The system of claim 11, wherein the first host computer system is further configured to:

detect that the one or more files retrieved from the isolated computing environment are infected with malware;

determine that the isolated computing environment is an infected isolated computing environment; and block, via the internal isolation firewall, communications between the infected isolated computing environment and the workspace and between the infected isolated computing environment and the untrusted network destination.

17. The system of claim 11, wherein the first host computer system is further configured to:
   detect that the one or more files from the isolated computing environment that is infected with malware have been opened in the workspace via the explicit user input;
   determine that the workspace is an infected workspace; and
   block, via the internal isolation firewall, an outgoing communication from the infected workspace back to the isolated computing environment to prevent the outgoing communication reaching the untrusted network destination via the isolated computing environment.

18. The system of claim 11, wherein the first host computer system is further configured to:
   detect that the one or more files are infected with malware and have been opened in the workspace via the explicit user input; and
   implement a host-based firewall associated the first host computer system to prevent outgoing communication from the workspace.

19. A method of configuring a host computer system, the method comprising:
   implementing a workspace, the workspace being configured by a host operating system to enable operation of a first set of one or more applications or processes via a first memory space;
   implementing an isolated computing environment, the isolated computing environment using the host operating system and comprising a sandboxed computing environment that uses a second memory space to enable operation of a second set of one or more applications or processes, wherein the second memory space is separate from the first memory space;
   isolating the isolated computing environment that uses the host operating system from the workspace that is configured by the host operating system using an internal isolation firewall;
   retrieving one or more files using at least one of the second set of one or more applications or processes associated with the isolated computing environment;
   requesting an explicit user input to allow the one or more files to be transferred from the isolated computing environment to the workspace; and
   on a condition that the explicit user input has been received, opening the one or more files using at least one of the first set of one or more applications or processes in the workspace, wherein the internal isolation firewall is configured to block transmission of the one or more files from the isolated computing environment to the workspace absent the explicit user input and block incoming communications from the isolated computing environment to the workspace.

* * * * *